(12) United States Patent
Hofmann et al.

(10) Patent No.: US 8,950,043 B2
(45) Date of Patent: Feb. 10, 2015

(54) CONNECTING ASSEMBLY

(75) Inventors: Juergen Hofmann, Eisenberg (DE); Markus Elsner, Kaiserslautern (DE); Hubert Loewe, Weselberg (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 58 days.

(21) Appl. No.: 13/376,205

(22) PCT Filed: Jun. 16, 2010

(86) PCT No.: PCT/EP2010/003593
§ 371 (c)(1),
(2), (4) Date: Feb. 15, 2012

(87) PCT Pub. No.: WO2010/145806
PCT Pub. Date: Dec. 23, 2010

(65) Prior Publication Data
US 2012/0131771 A1 May 31, 2012

(30) Foreign Application Priority Data

Jun. 16, 2009 (DE) .......................... 10 2009 024 983

(51) Int. Cl.
*F16B 21/07* (2006.01)
*F16B 17/00* (2006.01)
(Continued)

(52) U.S. Cl.
CPC ................ *B60N 3/026* (2013.01); *F16B 5/065* (2013.01); *F16B 5/0664* (2013.01); *F16B 21/075* (2013.01)
USPC ................................ 24/297; 411/41; 411/508

(58) Field of Classification Search
CPC ............... A44C 5/2047; A01K 27/005; A41D 2400/44; H05K 7/142; B60R 13/0206

USPC ........... 24/606, 607, 297, 295, 289, 453, 293; 411/508–510, 15, 41, 44–53, 56, 80.1, 411/80.2; 403/408.1; 52/718.03, 718.06, 52/716.7; 296/1.08, 39.1, 214, 146.7
See application file for complete search history.

(56) References Cited

U.S. PATENT DOCUMENTS 4,648,766 A * 3/1987 Wollar ............................ 411/41
4,804,303 A * 2/1989 Statkus ............................ 411/41
(Continued)

FOREIGN PATENT DOCUMENTS

DE 10 2004 030 583 1/2005
DE 102006032943 1/2007
(Continued)

*Primary Examiner* — Robert J Sandy
*Assistant Examiner* — Rowland Do
(74) *Attorney, Agent, or Firm* — Tarolli, Sundheim, Covell & Tummino LLP

(57) ABSTRACT

A connecting assembly (10) for fastening a mount-on part (12) to a carrier part (14), having a clip (16) which includes a deformable locking section (18) for fastening the clip (16) to the carrier part (14), and a separate locking pin (20) which is adapted to be received by the clip (16) by a movement in a mounting direction (22) along a mounting axis (A), the clip (16) and the locking pin (20) including cooperating latching members (24, 26) which form snap connections in a preassembly position and a locking position to fix the locking pin (20) axially on the clip (16). In the preassembly position the locking pin (20) and the clip (16) form a preassembled connecting assembly which is insertable into mounting openings (28, 30) of the mount-on part (12) and of the carrier part (14) by a movement along the mounting axis (A) and is movable to a fastening position.

12 Claims, 9 Drawing Sheets

(51) Int. Cl.
  *B60N 3/02* (2006.01)
  *F16B 5/06* (2006.01)

(56) References Cited

U.S. PATENT DOCUMENTS

| | | | |
|---|---|---|---|
| 5,211,519 A | | 5/1993 | Saito |
| 5,261,772 A | * | 11/1993 | Henninger et al. ............. 411/46 |
| 5,775,860 A | * | 7/1998 | Meyer ............................. 411/46 |
| 5,850,676 A | | 12/1998 | Takahashi et al. |
| 6,196,756 B1 | | 3/2001 | Leverger |
| 7,273,227 B2 | * | 9/2007 | Kawai et al. ................ 280/730.2 |
| 2004/0049894 A1 | * | 3/2004 | Jackson et al. .................. 24/293 |
| 2004/0265094 A1 | | 12/2004 | Gordon |
| 2005/0220560 A1 | * | 10/2005 | Shinozaki et al. .............. 411/37 |
| 2009/0263210 A1 | | 10/2009 | Loewe et al. |

FOREIGN PATENT DOCUMENTS

| | | |
|---|---|---|
| DE | 202008010262 | 11/2008 |
| GB | 2 300 878 | 11/1996 |
| GB | 2388150 | 11/2003 |

* cited by examiner

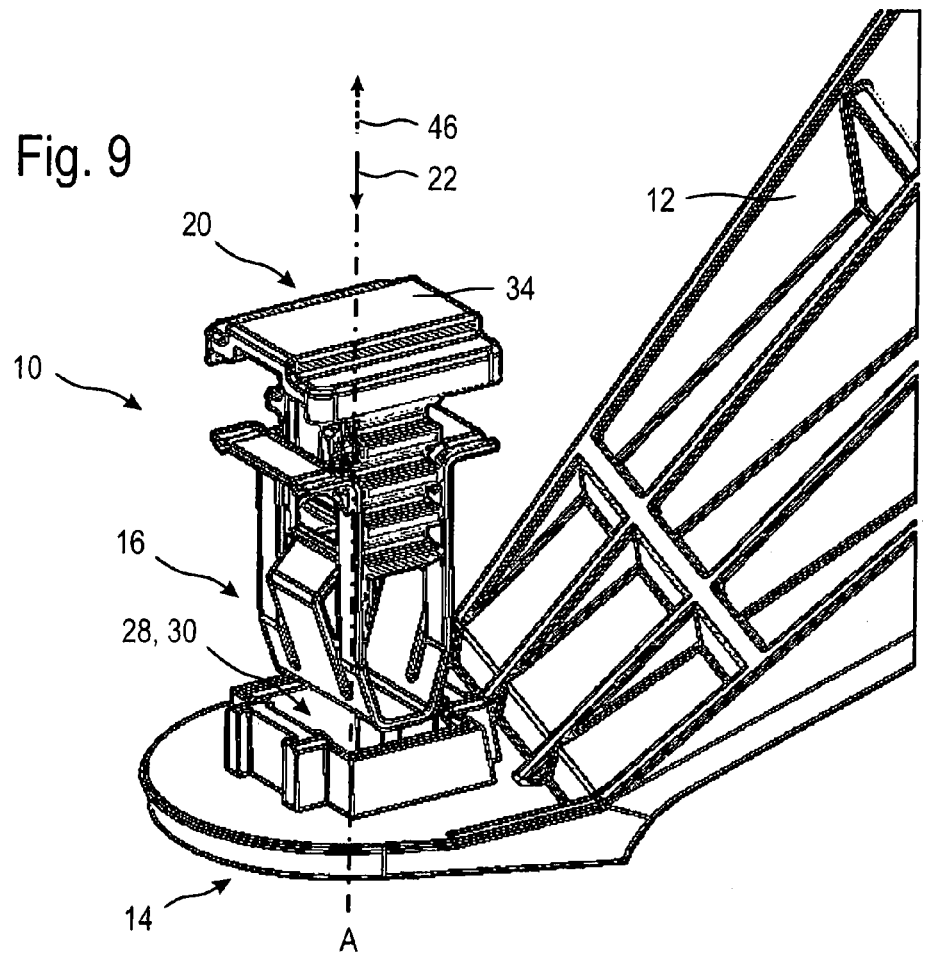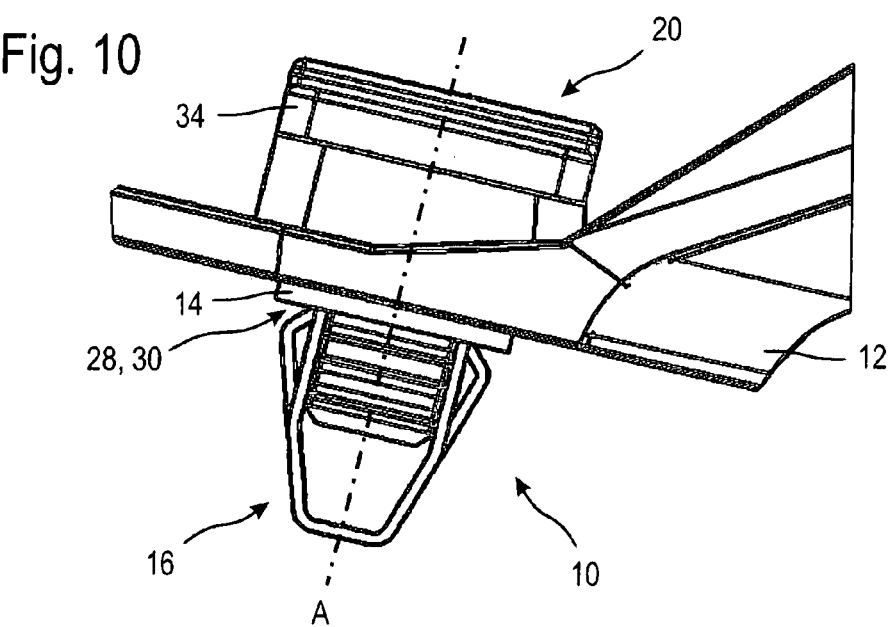

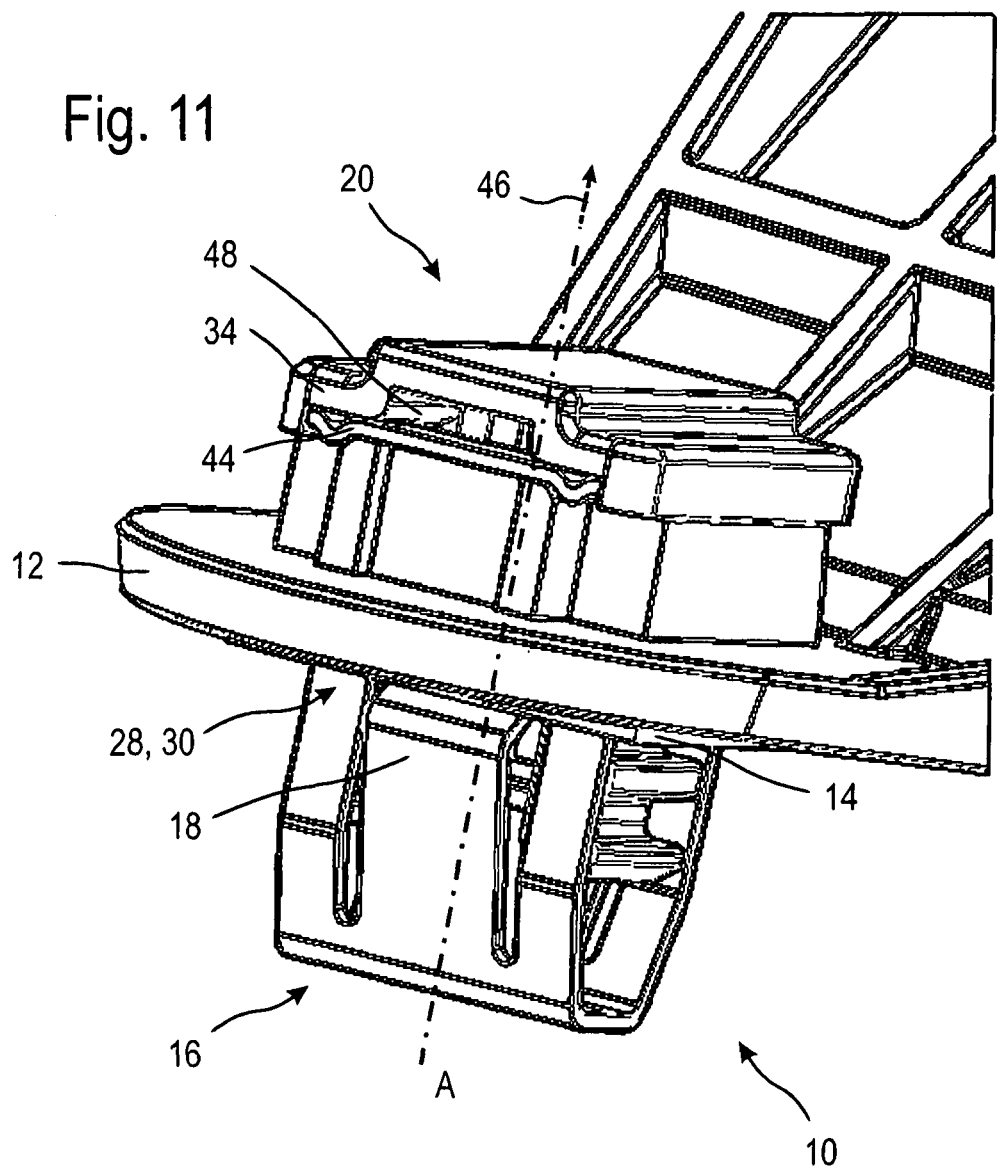

CONNECTING ASSEMBLY

RELATED APPLICATIONS

This application corresponds to PCT/EP2010/003593, filed Jun. 16, 2010, which claims the benefit of German Application No. 10 2009 024 983.4, filed Jun. 16, 2009, the subject matter, of which we incorporated herein by reference in their entirety.

BACKGROUND OF THE INVENTION

The present invention relates to a connecting assembly for fastening a mount-on part to a carrier part, having a clip which includes a deformable locking section for fastening the clip to the carrier part, and a separate locking pin which is adapted to be received by the clip by a movement in a mounting direction along a mounting axis, the clip and the locking pin including cooperating latching members which form snap connections in a preassembly position and in a locking position to fix the locking pin axially on the clip.

DE 10 2006 032 943 A1 discloses a vehicle grab handle including a generic connecting assembly. A metal clip of the connecting assembly is first pre-locked on a support block of the vehicle grab handle and secured in position. A securing element is then pressed between the side walls of the metal clip, the metal clip and the securing element establishing a form-fitting connection in a preassembly position. The vehicle grab handle is normally delivered in this preassembly position and fastened to the vehicle body. The fastening is carried out with ease by hand here, without any further separate fastening means being required.

SUMMARY OF THE INVENTION

It is the object of the invention to improve the connecting assembly especially with a view to its mounting and dismounting characteristics and to extend its area of application.

The object is achieved by a connecting assembly of the type initially mentioned, in which in the preassembly position the clip and the locking pin form a preassembled connecting assembly which is insertable into mounting openings of the mount-on part and of the carrier part by a movement along the mounting axis and is movable to a fastening position. The preassembled connecting assembly can then be transferred to its locking position by an axial relative movement between the locking pin and the clip, the mount-on part being reliably fastened to the carrier part in this locking position. Thus, in the preassembly position the connecting assembly is formed exclusively by the locking pin and by the clip which is captively connected with the locking pin, and may be made use of in an extremely flexible manner for fastening any desired mount-on part to a carrier part. Mount-on parts include, e.g., grab handles, bumpers, vehicle linings, door frames etc., while the carrier part may be a vehicle body sheet, for example.

In the preassembly position the snap connection particularly preferably has an axial holding force which is greater than an axial force of resistance when the connecting assembly is moved to or out of the fastening position. In this way, the mount-on part may be fastened to or detached from the carrier part in an advantageous manner exclusively by actuating the locking pin in or, respectively, contrary to the mounting direction.

In particular, the clip and the locking pin may include cooperating blocking members which in the preassembly position form a latching connection and prevent a nondestructive dismounting movement of the locking pin in relation to the clip contrary to the mounting direction. This makes sure that after the locking pin and the clip have been fitted together once, there is always a connecting assembly available that is ready for use, rather than any individual components that are of no use when separate.

To simplify the assembly process, the locking section of the clip preferably produces a snap connection with the mount-on part and/or the carrier part upon movement to the fastening position.

Particularly preferably, the clip is a metal clip. In contrast to plastic clips in which the quality of the fastening produced deteriorates in the course of time due to the relaxation behavior of plastic materials, the use of a clip made of metal provides a durable and highly loadable connection between the mount-on part and the carrier part, the high quality of this connection remaining largely constant over time.

In one embodiment of the connecting assembly, the clip is formed in one piece so as to minimize the number of individual parts.

As an alternative, the clip may also be formed in two pieces. It then preferably comprises a deformable locking part and a holding part receiving the locking part, at least the locking part being produced from metal. In this case the locking part may be identical in construction, largely independent of the geometry of the mount-on part or of the carrier part, and substantially determines the axial force of resistance to a detachment of the mount-on part fastened to the carrier part. Any geometric fine details such as the exact size of the mounting openings or the thickness of the mount-on part, on the other hand, may be taken into account in a simple way by means of appropriate adjustments of the holding part.

Expedient further developments of the invention and the advantages thereof will be apparent from the dependent claims.

BRIEF DESCRIPTION OF THE DRAWINGS

Further details will be discussed in more detail below with reference to the exemplary embodiments illustrated in the Figures, in which:

FIG. 9 shows a view of the connecting assembly according to FIG. 4 before a mount-on part is fastened to a carrier part;

FIG. 10 shows a view of the connecting assembly according to FIG. 7 after a mount-on part is fastened to a carrier part;

FIG. 11 shows a further view of the connecting assembly according to FIG. 7 after a mount-on part is fastened to a carrier part;

DESCRIPTION OF EXEMPLARY EMBODIMENTS

Figure 1:
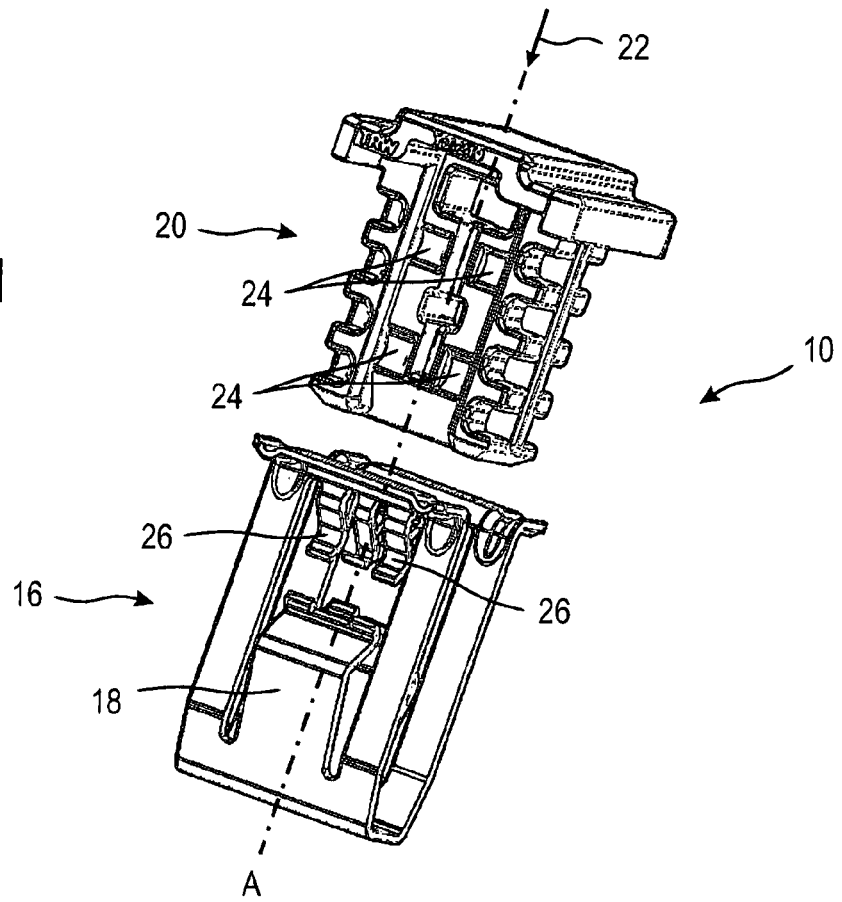
FIG. 1 shows a perspective view of the connecting assembly according to a first embodiment of the invention before the assembly is put together.
Figure 4:
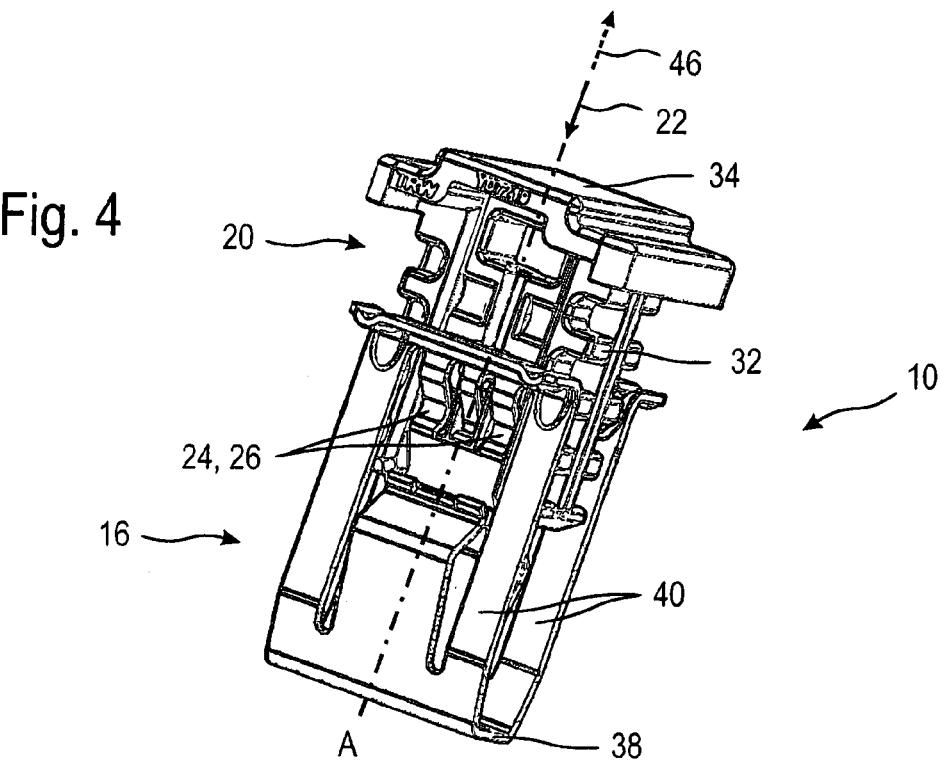
FIG. 4 shows a perspective view of the connecting assembly according to the first embodiment in a preassembly position.

FIG. 1 shows a first embodiment of a connecting assembly 10 which serves to fasten a mount-on part 12 to a carrier part 14 (cf. FIGS. 9 to 11). The connecting assembly 10 comprises a clip 16 which includes a deformable locking section 18 for fastening the clip 16 to the carrier part 14, and a separate locking pin 20 which is adapted to be received by the clip 16 by a movement in a mounting direction 22 along a mounting axis A. The clip 16 and the locking pin 20 include cooperating latching members 24, 26 which form snap connections in a preassembly position (FIGS. 4 and 5) and a locking position (FIGS. 7 and 8) to fix the locking pin 20 axially on the clip 16. In the preassembly position as seen in FIG. 4, the locking pin 20 and the clip 16 constitute a preassembled connecting assembly, which can be inserted into mounting openings 28, 30 of the mount-on part 12 and of the carrier part 14 by a movement along the mounting axis A (cf. FIG. 9) and can be moved to a fastening position (cf. FIGS. 10 and 11). In this fastening position of the preassembled connecting assembly, the locking pin 20 is then shifted further in the mounting direction 22, so that the connecting assembly 10 moves from the preassembly position to the locking position (FIGS. 10 and 11). In this locking position, the mount-on part 12 and the carrier part 14 are reliably connected with each other via the connecting assembly 10. Transversely to the mounting axis A, the connecting assembly 10 is subjected to a shearing stress, with a very high shearing force being required to release the mount-on part 12 from the carrier part 14, to which it is fastened. In addition, however, the locked connecting assembly 10 also withstands a high withdrawal force acting on the mount-on part 12 in the axial direction, so that when a connecting assembly 10 according to FIG. 1 is used, the mount-on part 12 preferably becomes detached from the carrier part 14 only in the case of withdrawal forces of more than 700 N, particularly preferably of more than 1 kN.

Figure 2:
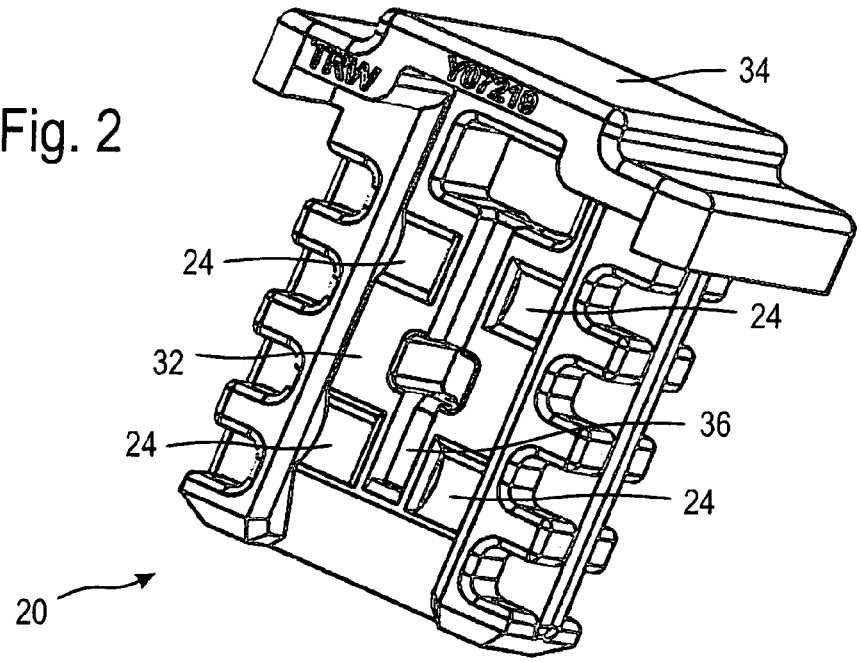
FIG. 2 shows a perspective detail view of a locking pin of the connecting assembly according to FIG. 1.

FIG. 2 shows the locking pin 20 according to FIG. 1 in a perspective detail view. Here, the locking pin 20 is a substantially rigid plastic part having a shank 32 for insertion into the clip 16. Molded integrally with one axial end of the shank 32 is a head 34 which in the locking position optionally rests against the clip 16 and which is adapted for engagement by a tool when the attachment between the mount-on part 12 and the carrier part 14 is released. In the area of an opposite axial end, the shank 32 tapers toward the end for easier insertion of the locking pin 20 into the clip 16.

The shank 32 is provided with recesses which form the latching members 24, and with an axially extending groove which forms a blocking member 36. The function of the latching and blocking members 24, 26 will be discussed in greater detail further below.

Figure 3:
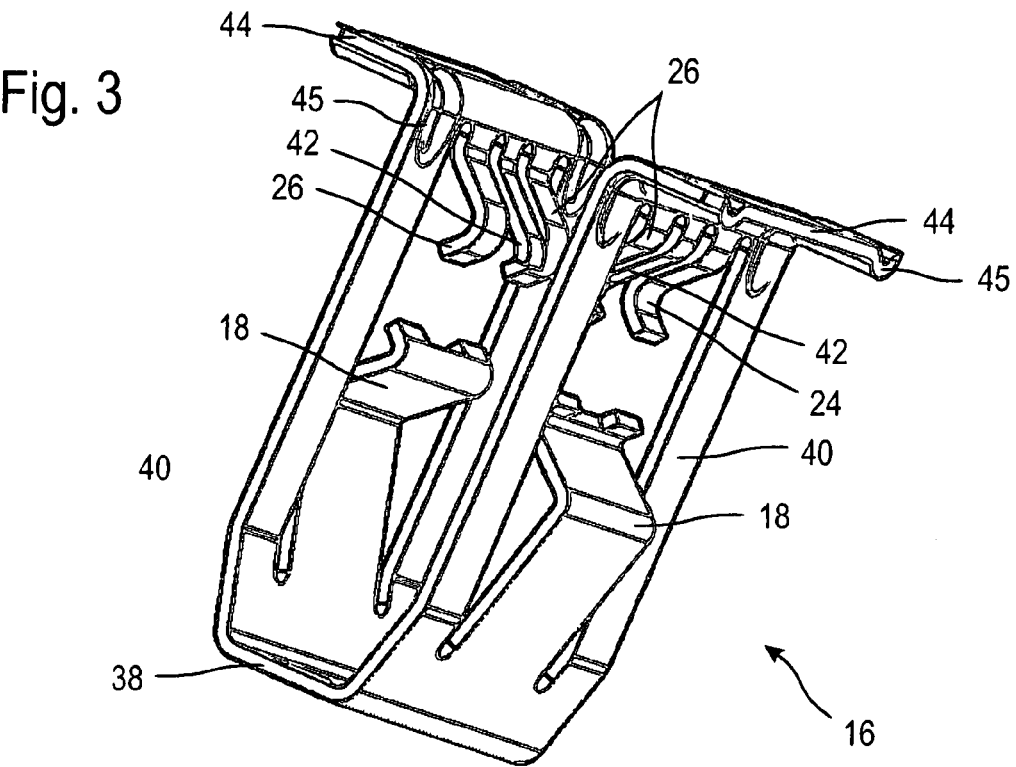
FIG. 3 shows a perspective detail view of a clip of the connecting assembly according to FIG. 1.

FIG. 3 shows the clip 16 of the connecting assembly 10 in a perspective detail view. The U-shaped clip 16 has a web 38 and a pair of opposite side walls 40 connected by the web 38, each side wall 40 including a deformable locking section 18. Each of the side walls 40 further has two deformable latching members 26 and an intermediate blocking member 42 formed therein. In addition, at an end opposite to the web 38, the side walls 40 each include an outwardly bent bearing extension 44. In the fastening position of the connecting assembly 10, these bearing extensions 44 rest against the rim of the mounting opening 28 and prevent a further movement of the clip 16 in the mounting direction 22 (cf. FIG. 11). Beads 45 may be formed in the transition region between the side walls 40 and the bearing extensions 44 to increase the stiffness of the connection and the stability.

The clip 16 as shown in FIG. 3 is in the form of a one-piece metal clip to establish a highly loadable connection with the carrier part 14; the quality of this connection in regard to freedom from play and holding force, for example, remaining largely constant over time. Any undesirable relaxation effects, which occur particularly in the case of plastic clips, detracting from the quality of the connection in the course of time, are prevented by the use of metal, preferably steel. In addition, the metal clip may be produced as a bent/stamped part at low cost.

FIG. 4 shows a perspective view of the connecting assembly 10 in the preassembly position. Proceeding from FIG. 1, the locking pin 20 here is shifted along the mounting axis A in the mounting direction 22 and received between the side walls 40 of the clip 16. In the preassembly position illustrated, the latching members 24 of the locking pin 20 form a snap connection with the latching members 26 of the clip 16 to fix the locking pin 20 axially in place on the clip 16. In the preassembly position this snap connection has an axial holding force which is greater than an axial force of resistance upon movement of the preassembled connecting assembly into or out of the fastening position. This offers the advantage that a fitter merely needs to engage the locking pin 20, either manually or using a simple tool, in order to fasten the mount-on part 12 to or release it from the carrier part 14. Upon a movement of the locking pin 20 in the mounting direction 22, the preassembled connecting assembly 10 according to FIG. 9 remains in the preassembly position until the connecting assembly 10 assumes its fastening position, i.e. until the bent bearing extensions 44 of the clip 16 rest against the rim of the mounting opening 28 of the mount-on part 12. Only after this fastening position is reached does the locking pin 20 move in relation to the clip 16 to the locking position of the connecting assembly 10, as is illustrated in FIG. 11.

To release the mount-on part 12 from the carrier part 14, it is, again, only necessary to engage the locking pin 20. In order to be able to better manipulate the locking pin 20 in a dismounting direction 46 opposite to the mounting direction 22, the connecting assembly 10 is configured such that in the locking position a slit 48 arises between the locking pin 20 and the clip 16, for a tool (not shown) to engage therein. With the aid of the tool, the locking pin 20 can be moved relative to the clip 16 in the dismounting direction 46. As soon as the preassembly position is reached, the locking pin 20 and the clip 16 again form a snap connection the axial holding force of which is so great that by a further movement of the locking pin 20 in the dismounting direction, the entire connecting assembly 10 can be removed from the mounting openings 28, 30 in the preassembly position (FIG. 9). The connecting assembly 10 is ready for use again immediately and may preferably be used several times.

The above-mentioned axial force of resistance that acts when the connecting assembly 10 is moved to or out of the fastening position is produced, for example, in that upon movement to the fastening position the locking section 18 of the pin 16 establishes a snap connection with the mount-on part 12 and/or the carrier part 14. When the connecting assembly 10 is manufactured with a very precise fit in relation to the mounting openings 28, 30, this force of resistance furthermore also includes a certain friction component.

Figure 5:
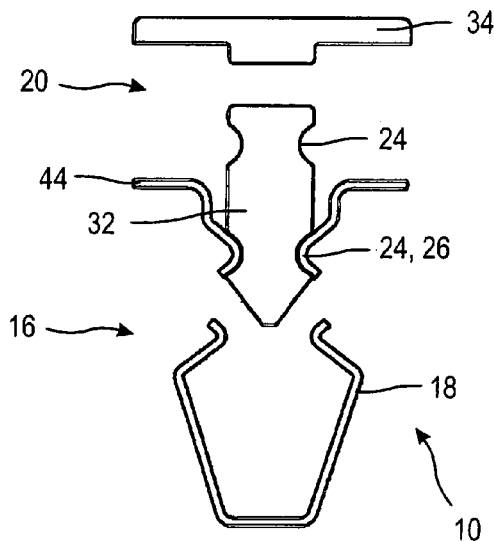
FIG. 5 shows a longitudinal section through the connecting assembly according to FIG. 4.

FIG. 5 shows a longitudinal section through the connecting assembly 10 as seen in FIG. 4, the section being made through the latching members 24, 26 of the locking pin 20 and of the clip 16, respectively, so that the snap connection between the latching members 24, 26 is particularly well visible. Since the sections snapping into each other of the latching members 24, 26 are roughly in a circular segment shape in the section according to FIG. 5, this snap connection may be released again without any difficulty after an axial holding force is overcome, the holding force preferably amounting to approx. 50 to 100 N.

Figure 6:
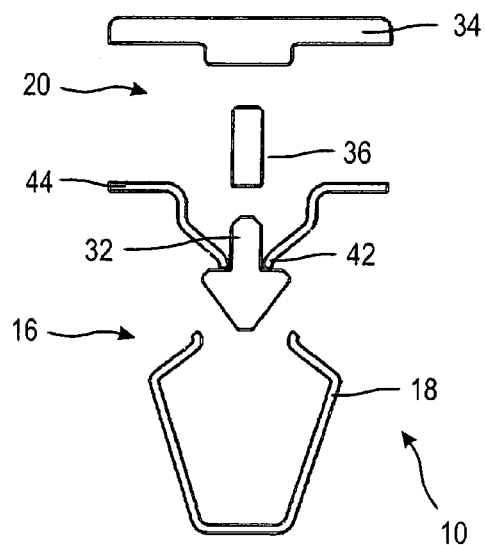
FIG. 6 shows a further longitudinal section through the connecting assembly according to FIG. 4.

FIG. 6 shows a longitudinal section through the connecting assembly 10 according to FIG. 4, the section running centrally through the blocking members 36, 42 of the locking pin 20 and of the clip 16, respectively. Based on the blocking member geometry as provided for in FIG. 6, it is clear that in the preassembly position the blocking members 36, 42 form a latching connection and thereafter prevent a nondestructive dismounting movement of the locking pin 20 relative to the clip 16 contrary to the mounting direction 22. Accordingly, after the connecting assembly 10 is fitted together once, assuming the preassembly position, the locking pin 20 is captively connected with the clip 16. Moreover, it is made sure by these blocking members that when the connecting assembly 10 is dismounted by means of pulling axially on the locking pin 20 in the dismounting direction 46, the clip 16 will also be released and will not remain in the mounting openings 28, 30.

Figure 7:
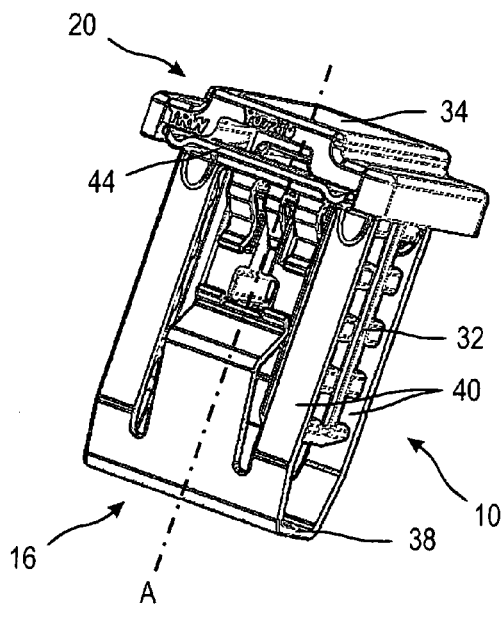
FIG. 7 shows a perspective view of the connecting assembly according to the first embodiment in a locking position.

FIG. 7 shows the connecting assembly 10 according to FIG. 1 in the locking position, in which the head 34 of the locking pin 20 is partially adjacent to the bearing extensions 44 of the clip 16 or in some circumstances even partially in contact with the bearing extensions 44.

Figure 8:
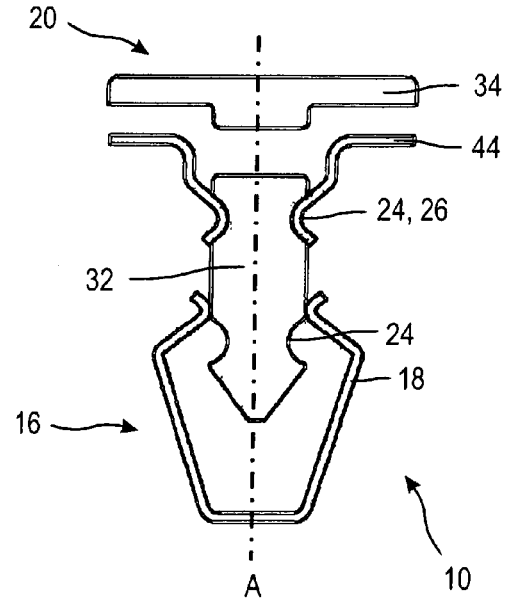
FIG. 8 shows a longitudinal section through the connecting assembly according to FIG. 7.

FIG. 8 illustrates a longitudinal section through the connecting assembly 10 according to FIG. 7, the section being made through the latching members 24, 26, by analogy with FIG. 5. Again, it is clearly shown that the latching members 24 of the locking pin 20 and the latching members 26 of the clip 16 establish a snap connection in the locking position as well. In addition, it becomes clear that the shank 32 locks the locking sections 18. This means that the shank 32 moves the locking sections 18 outwards away from the mounting axis A or at least prevents a movement of the locking sections 18 inwards, towards the mounting axis A. In the installed condition, the locking sections 18 of the connecting assembly 10 which is in the locking position according to FIG. 8 engage behind the mounting opening 30 of the carrier part 14 (cf. FIG. 10). As a result, the mount-on part 12 is reliably fastened to the carrier part 14, both along the mounting axis A and also transversely thereto.

FIG. 9 shows the connecting assembly 10 in its preassembly position shortly before insertion into the mounting openings 28, 30 of the mount-on part and the carrier part 12, 14, respectively. FIG. 9 could, however, equally show the dismounting process when the connection between the mount-on part 12 and the carrier part 14 is released and in which the connecting assembly 10 is first unlocked into the preassembly position and then removed in the dismounting direction 46.

FIG. 10 shows the mount-on part 12 fastened to the carrier part 14 by means of the connecting assembly 10. Here, the connecting assembly 10 is both in the fastening position, in which the bearing extensions 44 of the clip 16 rest against the rim of the mounting opening 28 of the mount-on part 12, and also in the locking position, in which the deformable latching members 26 of the clip 16 form a snap connection with the latching members 24 of the locking pin 20 that are nearest to the head 34. In addition, in the locking position sections of the head 34 may also rest against the bearing extensions 44.

FIG. 11 shows the situation according to FIG. 10 merely from a different perspective. The slit 48 which is produced in the locking position between the bearing extensions 44 and the head 34 can be clearly seen here. This slit 48 may, for example, be engaged by a suitable tool which, when moved in the dismounting direction 46, first unlocks the connecting assembly 10 into the preassembly position and then removes the entire connecting assembly 10 from the mounting openings 28, 30 to release the mount-on part 12 from the carrier part 14.

FIGS. 12 to 22 show the connecting assembly 10 in a second, more compact, embodiment. The first and second embodiments are largely identical here in terms of fundamental structure and function, for which reason reference is only made in this respect to the description of the first embodiment according to FIGS. 1 to 11 in order to avoid repetitions. In the following, principally the differences between the embodiments will be discussed, which essentially relate to structural details of the locking pin 20 and the clip 16.

Figure 12:
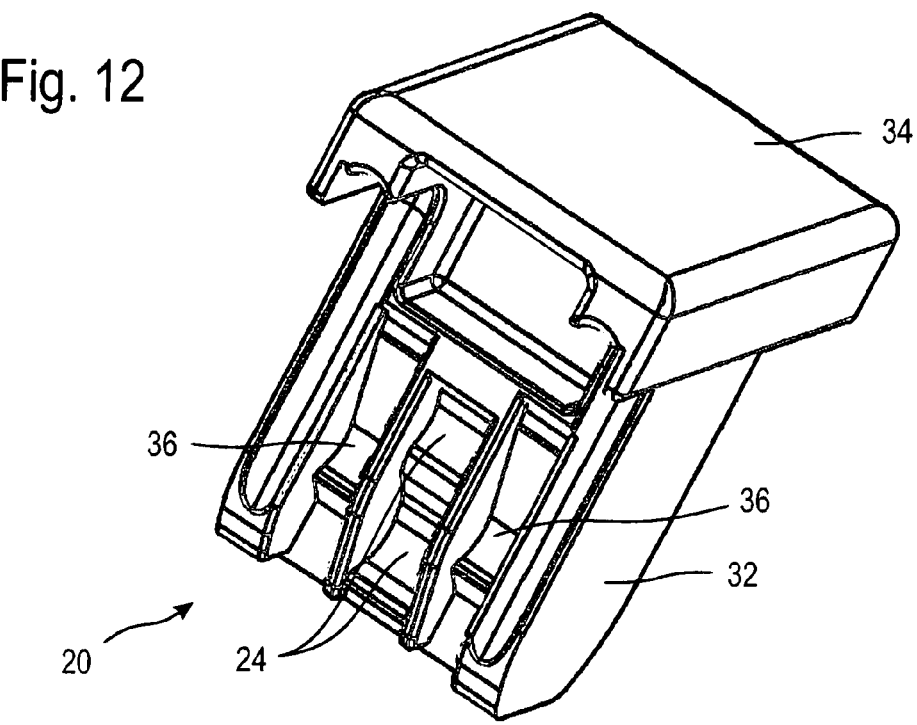
FIG. 12 shows a perspective detail view of a locking pin of the connecting assembly according to a second embodiment of the invention.

Analogous to FIG. 2, FIG. 12 shows the locking pin 20 of the connecting assembly 10. Unlike in the first embodiment, the latching members 24 here are arranged in the middle between the blocking members 36.

Figure 13:
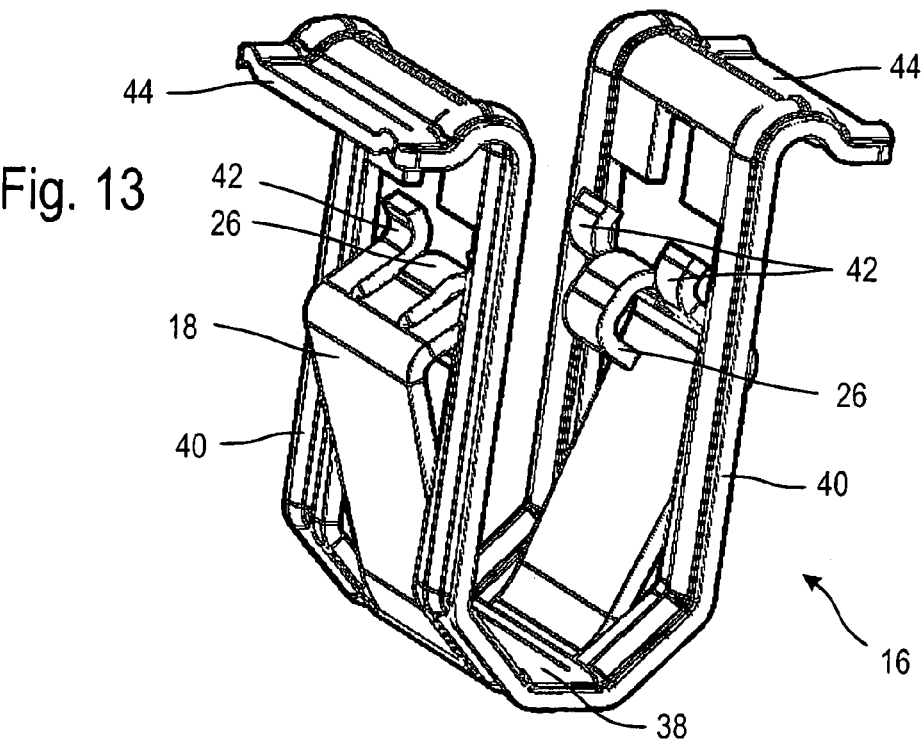
FIG. 13 shows a perspective detail view of a clip of the connecting assembly according to the second embodiment of the invention.

Analogous to FIG. 3, FIG. 13 shows the clip 16 of the connecting assembly 10 in accordance with the second embodiment. The most essential difference here is that the locking sections 18 include the blocking members 42 and the latching members 26.

Figure 14:
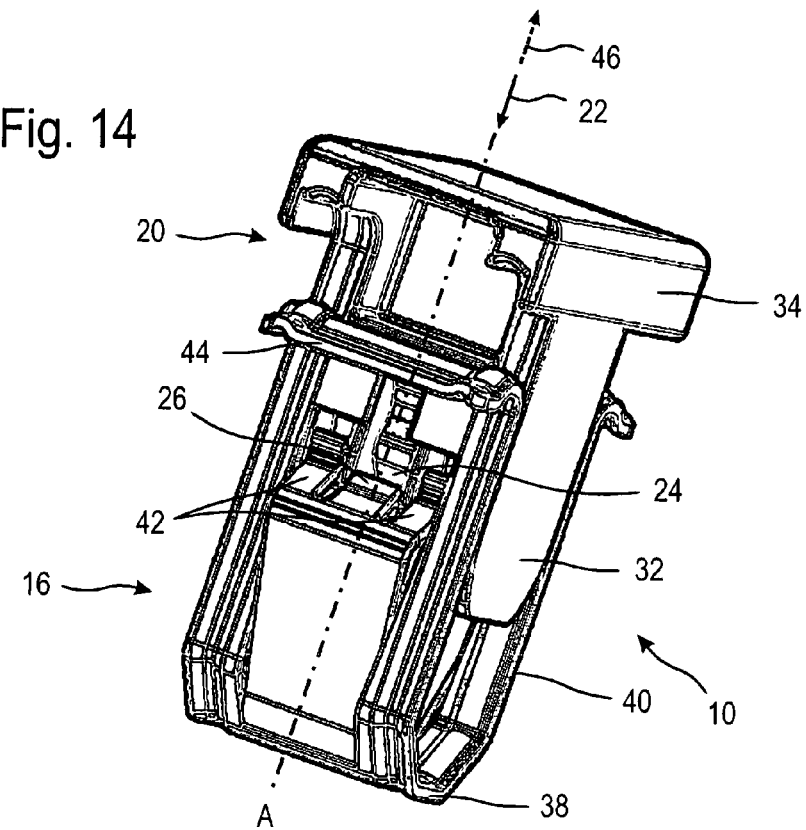
FIG. 14 shows a perspective view of the connecting assembly according to the second embodiment of the invention in the preassembly position.

Analogous to FIG. 4, FIG. 14 represents the connecting assembly 10 in the preassembly position.

Figure 15:
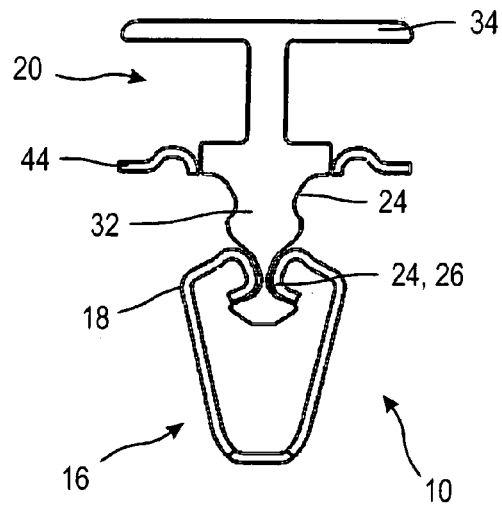
FIG. 15 shows a longitudinal section through the connecting assembly according to FIG. 14.

FIG. 15 shows a longitudinal section through the connecting assembly 10 according to FIG. 14, the section running centrally through the latching members 24, 26.

Figure 16:
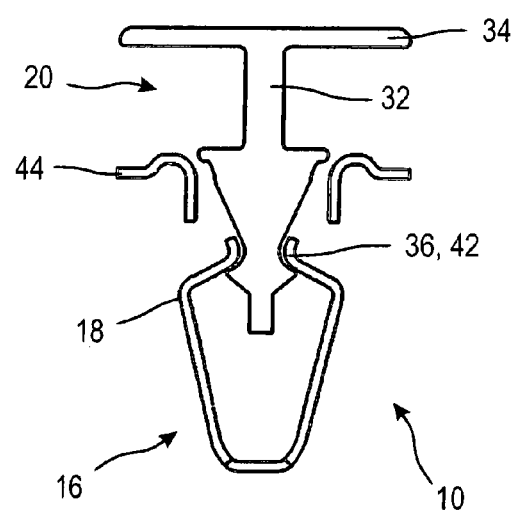
FIG. 16 shows a further longitudinal section through the connecting assembly according to FIG. 14.

FIG. 16 likewise shows a longitudinal section through the connecting assembly 10 according to FIG. 14, the cutting plane however being offset from the middle so as to run through the blocking members 36, 42. It is apparent from the geometry of the cooperating blocking members 36, 42 that in this second embodiment of the connecting assembly 10, starting from the preassembly position according to FIG. 16, the locking pin 20 and the clip 16 may also be separated from each other again in a nondestructive manner, so that they are again available in the form of unconnected, separate structural components. The axial holding force between the locking pin 20 and the clip 16 in the preassembly position can be adjusted here by means of changes in geometry, in particular changes in the angles of the run-up slopes of the latching members 24, 26 and/or the blocking members 36, 42.

Figure 17:
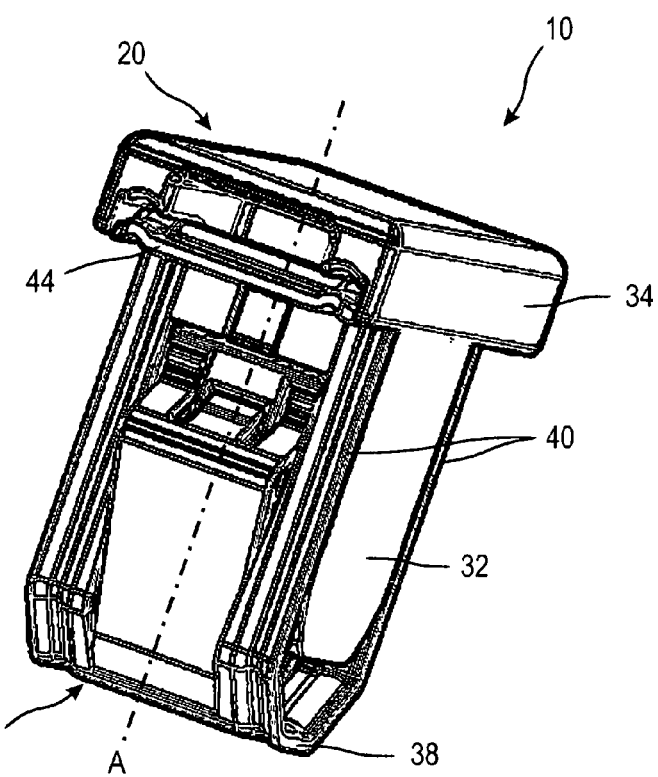
FIG. 17 shows a perspective view of the connecting assembly according to the second embodiment in a locking position.

Analogous to FIG. 7, FIG. 17 illustrates the connecting assembly 10 in the locking position.

Figure 18:
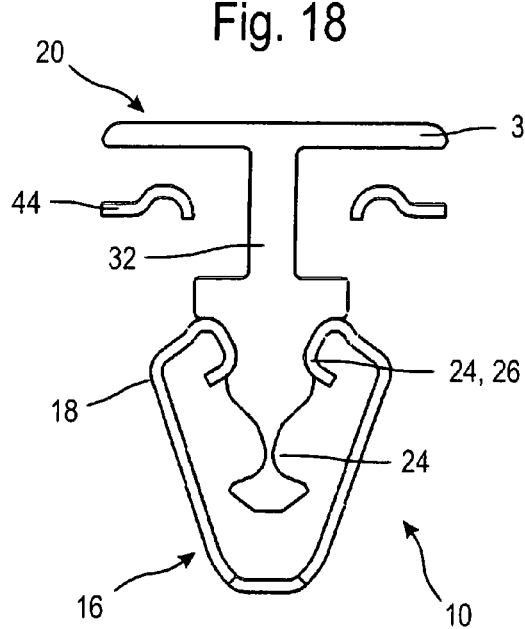
FIG. 18 shows a longitudinal section through the connecting assembly according to FIG. 17.
Figure 19:
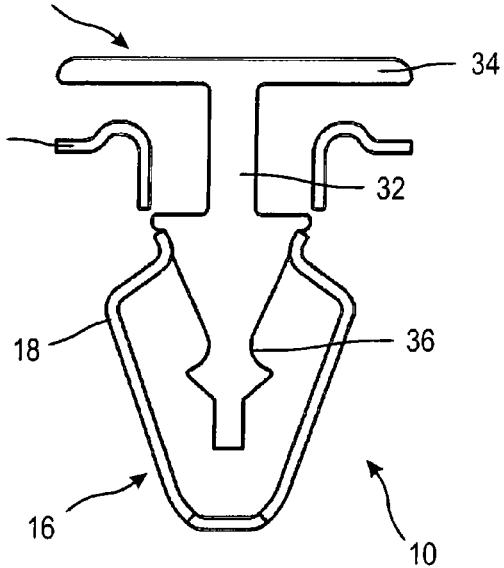
FIG. 19 shows a further longitudinal section through the connecting assembly according to FIG. 17.

FIGS. 18 and 19 show sections through the connecting assembly 10 according to FIG. 17, with the cutting planes corresponding to those of FIGS. 15 and 16. It is apparent from the sectional drawings that the oppositely located locking sections 18 of the clip 16 are pushed apart by the shank 32 of the locking pin 20 when the connecting assembly 10 is transferred from the preassembly position to the locking position.

Figure 20:
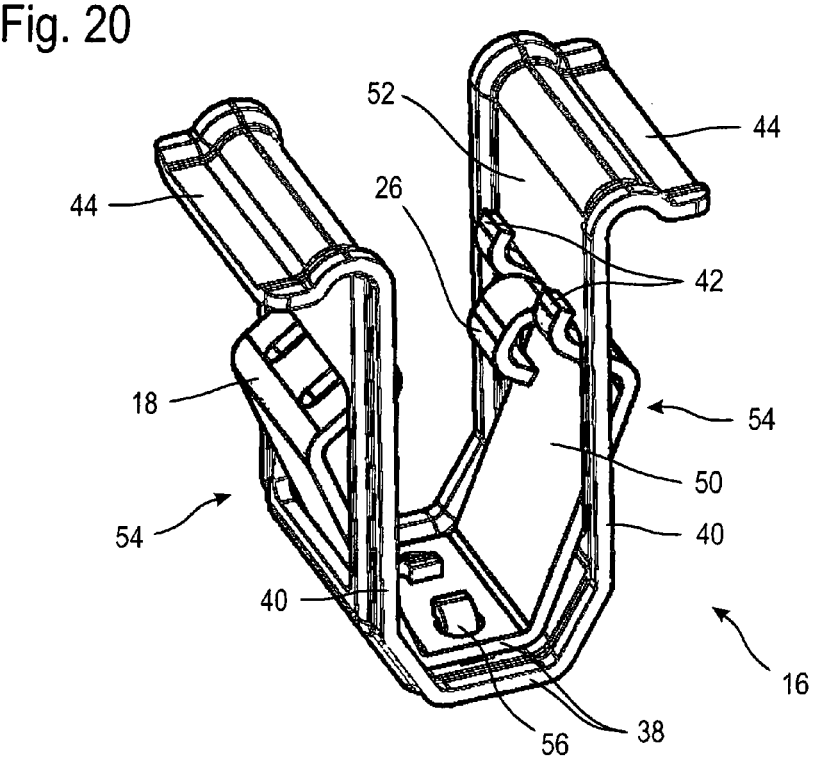
FIG. 20 shows a perspective view of the clip according to FIG. 13 in an alternative, two-piece design variant.
Figure 21:
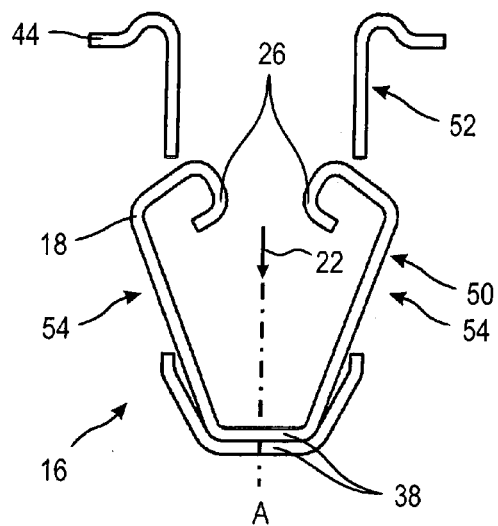
FIG. 21 shows a longitudinal section through the clip according to FIG. 20.
Figure 22:
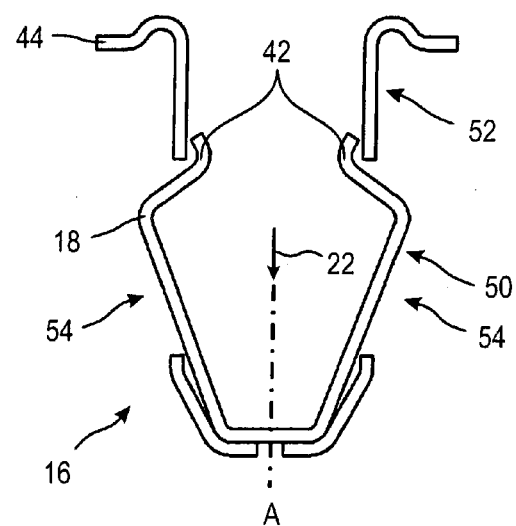
FIG. 22 shows a further longitudinal section through the clip according to FIG. 20.

FIGS. 20 to 22 show a two-piece design variant of the clip 16 for the connecting assembly 10 according to the second embodiment. In this design variant the clip 16 comprises a deformable locking part 50 and a holding part 52 receiving the locking part 50. At least the locking part 50, preferably also the holding part 52, is produced from metal here.

The two-piece clip 16 according to FIG. 20 is put together by inserting the U-shaped locking part 50 into the likewise U-shaped holding part 52 in the mounting direction 22. In the process, the locking sections 18 of the locking part 50 clip into side wall cutouts 54 of the holding part 52, so that the locking part 50 is fixed in place on the holding part 52. Additional holding means 56 may be optionally provided in the region of the webs 38 of the locking and holding parts 50, 52. As shown in FIG. 20, these holding means 56 are tongues formed in the web 38 of the holding part 52, which are inserted through openings formed in the web 38 of the locking part 50 and then bent over so as to reliably fasten the locking part 50 to the holding part 52.

FIGS. 21 and 22 show longitudinal sections through the clip 16 according to FIG. 20, the cutting planes corresponding to those of FIGS. 15 and 16 or FIGS. 18 and 19, respectively. Here, the side walls 40 of the holding part 52 constitute stops for the blocking members 42, so that the movement of the locking sections 18 away from each other is limited. This prevents the locking sections 18 from completely moving outwards through the side wall cutouts 54 and deforming in an undesirable fashion.

The invention claimed is:

1. A connecting assembly (10) for fastening a mount-on part (12) to a carrier part (14), comprising
    a clip (16) which includes a deformable locking section (18) for fastening the clip (16) to the carrier part (14), and
    a separate locking pin (20) which is adapted to be received by the clip (16) by a movement in a mounting direction (22) along a mounting axis (A),
    the clip (16) and the locking pin (20) including cooperating latching members (24, 26) which form a snap connection in a preassembly position and a snap connection in a locking position to fix the locking pin (20) axially on the clip (16),
    wherein in the preassembly position the locking pin (20) and the clip (16) form a preassembled connecting assembly which is insertable into mounting openings (28, 30) of the mount-on part (12) and of the carrier part (14) by a movement along the mounting axis (A) and is movable to a fastening position,
    the snap connection in the preassembly position having an axial holding force which is greater than an axial force of resistance when the connecting assembly (10) is moved to and out of the fastening position, and
    in the fastening position the locking section (18) of the clip (16) has a detachable snap connection with the mount-on part (12) and/or the carrier part (14),
    the clip (16) being formed in two pieces and including a deformable locking part (50) and a holding part (52) receiving the locking part (50), at least the locking part (50) being produced from metal.

2. The connecting assembly according to claim 1, wherein the clip (16) and the locking pin (20) include cooperating blocking members (36, 42) which in the preassembly position form a latching connection and prevent a nondestructive dismounting movement of the locking pin (20) in relation to the clip (16) contrary to the mounting direction (22).

3. The connecting assembly according to claim 1, wherein the clip (16) includes a web (38) and a pair of opposite side walls (40) connected by the web (38), each of the side walls (40) including a deformable locking section (18).

4. The connecting assembly according to claim 3, wherein each of the side walls (40) includes a deformable blocking member (42).

5. The connecting assembly according to claim 4, wherein the locking section (18) includes the blocking member (42) and/or the latching member (26).

6. The connecting assembly according to claim 3, wherein the side walls (40) each include a deformable latching member (26).

7. The connecting assembly according to claim 3, wherein each of the side walls (40) includes a pair of deformable latching members (26) and a blocking member (42) in between.

8. The connecting assembly according to claim 1, wherein the locking pin (20) is a substantially rigid plastic part.

9. The connecting assembly according to claim 1, wherein the clip (16) is a metal clip.

10. The connecting assembly according to claim 1, wherein the clip (16) is formed in one piece.

11. A connecting assembly for fastening a mount-on part to a carrier part, comprising
    a clip which includes a deformable locking section for fastening the clip to the carrier part, and
    a separate locking pin which is adapted to be received by the clip by a movement in a mounting direction along a mounting axis,
    the clip and the locking pin including cooperating latching members which form snap connections in a preassembly position and a locking position to fix the locking pin axially on the clip,
    in the preassembly position the locking pin and the clip forming a preassembled connecting assembly which is insertable into mounting openings of the mount-on part and of the carrier part by a movement along the mounting axis and is movable to a fastening position,
    the clip and the locking pin including cooperating blocking members which in the preassembly position form a latching connection and prevent a nondestructive dismounting movement of the locking pin in relation to the clip contrary to the mounting direction,
    the clip including a web and a pair of opposite side walls connected by the web, the side walls each including a deformable locking section, and
    the side walls each including a pair of deformable latching members and a blocking member in between.

12. A connecting assembly for fastening a mount-on part to a carrier part, comprising
    a clip which includes a deformable locking section for fastening the clip to the carrier part, and
    a separate locking pin which is adapted to be received by the clip by a movement in a mounting direction along a mounting axis, the clip and the locking pin including cooperating latching members which form snap connections in a preassembly position and a locking position to fix the locking pin axially on the clip, in the preassembly position the locking pin and the clip forming a preassembled connecting assembly which is insertable into mounting openings of the mount-on part and of the carrier part by a movement along the mounting axis and is movable to a fastening position, the clip and the locking pin including cooperating deformable blocking members which in the preassembly position form a latching connection, the clip including a U-shape with a web and a pair of opposite side walls connected by the web, each of the side walls including both a deformable locking section and one of the cooperating deformable blocking members.

* * * * *